(12) United States Patent
Plopski et al.

(10) Patent No.: US 8,518,219 B2
(45) Date of Patent: Aug. 27, 2013

(54) PROCESS FOR THE TREATMENT OF ORGANIC WASTE AND PRODUCT OBTAINED THEREOF

(75) Inventors: Yefim Plopski, Be'er Sheva (IL); Alexander Rogov, Be'er Sheva (IL)

(73) Assignee: Metal Tech Ltd., Beer Sheva (IL)

( * ) Notice: Subject to any disclaimer, the term of this patent is extended or adjusted under 35 U.S.C. 154(b) by 277 days.

(21) Appl. No.: 12/811,589

(22) PCT Filed: Jan. 1, 2009

(86) PCT No.: PCT/IL2009/000001
§ 371 (c)(1),
(2), (4) Date: Aug. 31, 2010

(87) PCT Pub. No.: WO2009/083985
PCT Pub. Date: Jul. 9, 2009

(65) Prior Publication Data
US 2010/0314241 A1 Dec. 16, 2010

(30) Foreign Application Priority Data
Jan. 2, 2008 (IL) .......................................... 188541

(51) Int. Cl.
*B01D 11/00* (2006.01)
(52) U.S. Cl.
USPC ............... 203/43; 203/46; 203/47; 203/73; 203/86; 203/91; 210/634
(58) Field of Classification Search
USPC ............... 203/76, 43, 46, 47, 73, 50, 86, 91; 208/46; 210/634, 770, 197, 511
See application file for complete search history.

(56) References Cited

U.S. PATENT DOCUMENTS

| | | | |
|---|---|---|---|
| 3,714,038 A | 1/1973 | Marsh | |
| 3,754,376 A * | 8/1973 | Kent | ................................ 95/258 |
| 3,962,044 A | 6/1976 | Mackenzie | |
| 4,030,981 A | 6/1977 | Hess et al. | |
| 4,032,428 A | 6/1977 | Johnson | |
| 4,089,773 A | 5/1978 | Espenscheid | |
| 4,098,649 A | 7/1978 | Redker | |
| 4,118,281 A | 10/1978 | Yan | |

(Continued)

FOREIGN PATENT DOCUMENTS

| | | | |
|---|---|---|---|
| CA | 1001493 A | 12/1976 | |
| CA | 1075003 A | 4/1980 | |

(Continued)

OTHER PUBLICATIONS

"Municipal Wastewater Sludge Combustion Technology", U.S. Environmental Protection Agency Center for Environmental Research Information, Cincinnati, Ohio 45268; "Converting Sludge Solids to Fuel Oil—the Battelle Northwest Process" "Converting Sludge to Oil by Hydroliquefaction" V-14-V-17; 10 pgs.

(Continued)

*Primary Examiner* — Nina Bhat
(74) *Attorney, Agent, or Firm* — Greenberg Traurig, LLP

(57) ABSTRACT

Organic waste disposal technologies are disclosed herein. A multistage processing of sewage sludge into synthetic fuel and chemical products is carried out by means of a direct thermo-chemical liquefaction process. The process enables the minimization of coke formation by utilizing steam stripping in the processing of sewage sludge.

14 Claims, 9 Drawing Sheets

(56) References Cited

U.S. PATENT DOCUMENTS

| | | | |
|---|---|---|---|
| 4,145,188 A | 3/1979 | Espenscheid et al. | |
| 4,210,491 A | 7/1980 | Schulman | |
| 4,344,770 A | 8/1982 | Capener et al. | |
| 4,618,735 A | 10/1986 | Bridle et al. | |
| 4,781,796 A | 11/1988 | Bridle et al. | |
| 5,681,449 A | 10/1997 | Yokoyama et al. | |
| 5,847,248 A | 12/1998 | Bridle et al. | |
| 5,865,956 A | 2/1999 | Bridle et al. | |
| 7,276,148 B2 | 10/2007 | Plopski | |
| 7,572,366 B2 * | 8/2009 | Powers | 208/363 |
| 2006/0151357 A1 * | 7/2006 | Plopski | 208/46 |

FOREIGN PATENT DOCUMENTS

| | | |
|---|---|---|
| CA | 1100817 A | 5/1981 |
| DE | 42 24 953 C1 | 7/1992 |
| DE | 4224953 | 12/1993 |
| EP | 0 052 334 A2 | 5/1982 |

OTHER PUBLICATIONS

Plopsky et al., "Producing Fuel and Chemicals from Sewage Sludge of Municipal Waste Water Treatment Plants: An Innovative Solution to the Problem of Disposal of Sewage Sludge and Other Organic Wastes", vol. 67, p. 21, Chemistry.

Vigil et al., "Thermal Gasification of Densified Sewage Sludge and Solid Waste", 53rd Annual Water Pollution Control Federation (WPCF) Conference at Las Vegas, Nevada, Oct. 1980.

Kranich et al., "Hydroliquefaction of Sewage Sludge", Proceedings of the National Conference on Municipal and Industrial Sludge Utilization and Disposal, Washington, DC; May 1980.

Bayer et al., "Low Temperature Conversion of Sludge and Waste to Oil", RI-Sludge; International Recycling Congress, 1982, Berlin, Federal Reupblic of Germany, pp. 314-319.

International Search Report from International Application No. PCT/IL2009/000001 dated Aug. 10, 2009.

International Search Report based on PCT/IL2009/000001 mailed Aug. 10, 2009.

* cited by examiner

LIPIDS

GLYCERIDES  CERIDES  STERIDES

CARBOHYDRATES

CELLULOSE

PROTEINS

PEPTIDIC CHAIN

LIGNIN

PROCESS FOR THE TREATMENT OF ORGANIC WASTE AND PRODUCT OBTAINED THEREOF

RELATED APPLICATIONS

This application is a national phase filing under 35 U.S.C. 371 of International Application No. PCT/IL2009/000001, filed on Jan. 1, 2009, and claims the benefit of Israeli Application Number 188541, filed Jan. 2, 2008, the entirety of these applications are hereby incorporated herein by reference for the teachings therein.

FIELD OF THE INVENTION

The present invention relates to organic waste disposal technologies, and more specifically, to a multi-stage processing of sewage sludge into synthetic fuel and chemical products by means of a direct thermo-chemical liquefaction process.

BACKGROUND OF THE INVENTION

Sewage sludge is the thick, malodorous slurry left behind in a sewage treatment plant after its load of human and industrial chemical wastes has been bio-chemically treated and the wastewater discharged.

The large amount of human waste in sewage treatment plants means that the sludge contains high concentrations of phosphates and nitrates, desirable components of fertilizer. However, the industrial wastes that are present in sewage cause toxic materials such as industrial solvents, heavy metals, and even nuclear waste to be left behind in sludge. When sewage sludge is applied to the fields, both the nutrients and the toxic chemicals are released to the environment. There are many of these toxic chemicals, and they are often found in high concentrations.

Sewage sludge solids comprise a mixture of organic materials composed mainly of crude proteins, lipids and carbohydrates, and inorganic materials, comprising significant quantities of silt, grit, clay and lower levels of heavy metals. In addition, the bacteria still alive are pathogenic and may contaminate soils and subsequently ground water. Typical raw sewage sludge comprises about 60-80% volatile material, and contains about 25-40% organic carbon (Table 1). Disposal of the sludge is expensive and normally constitutes up to 50% of the total annual costs of wastewater treatment. The major sludge disposal options currently used include agricultural utilization, land-filling and incineration (See FIG. 1).

TABLE 1

Activated Sludge Characteristics

| Characteristic | Range of values | Typical value | Comments |
|---|---|---|---|
| pH | 6.5-8.0 | — | Can be less in purity oxygen |
|  | — | 5.5 | systems or if anaerobic decomposition begins. Baltimore, Maryland |
| Heating value, Btu/lb, (KJ/kg) | — | 6,540 (15,200) | Increases with percent volatile content. |
| Specific gravity of individual solid particles | — | 1.08 |  |
| Bulk specific gravity | — | $1.0 \div 7.0 \times 10^{-8} \times C$ | C is suspended solids concentration, in mg/l. |
| Color | — | Brown | Some grayish sludge been noted. Activated sludge becomes black upon anaerobic decomposition. |
| Carbon/Nitrogen ratio | — | 12.9 | Baltimore, Maryland |
|  | — | 6.6 | Jasper, Indiana |
|  | — | 14.6 | Richmond, Indiana |
|  | — | 5.7 | Southwest plant, Chicago, Illinois |
|  | — | 3.5 | Milwaukee, Wisconsin (heat dried) |
| Organic carbon, percent by weight of dry solids | 17-41 | — | Zurich, Switzerland |
|  | 23-44 | — | Four plants |
| Nitrogen, percent by weight of dry solids (expressed as N) | 4.7-6.7 | — | Zurich, Switzerland |
|  | — | 5.6 | Chicago, Illinois |
|  | 2.4-5.0 | — | Four plants |
|  | — | 6.0 | Milwaukee, Wisconsin |
| Phosphorus, percent by weight of dry solids as $P_2O_5$ (divide by 2.29 to obtain phosphorus as P) | 3.0-3.7 | — | Zurich, Switzerland |
|  | — | 7.0 | Chicago, Illinois |
|  | 2.8-11.0 | — | Four plants |
|  | — | 4.0 | Milwaukee, Wisconsin |
| Potassium, percent by weight of dry solids as $K_2O$ (divide by 1.2 to obtain potassium as K) | 0.5-0.7 | — | Zurich, Switzerland |
|  | — | 0.56 | Chicago, Illinois |
|  | — | 0.41 | Milwaukee, Wisconsin |
| Volatile solids, percent by weight of dry solids (percent ash is 100 minus percent volatile) | 61-75 | — | Zurich, Switzerland |
|  | — | 63.0 |  |
|  | 62-75 | — |  |
|  | 59-70 | — | Four plants |
|  | — | 76.0 | Renton, Washington (Seattle Metro), 1976 average |
|  | — | 88.0 | San Ramon, California (Valley Community Services District), 1975 average |

TABLE 1-continued

Activated Sludge Characteristics

| Characteristic | Range of values | Typical value | Comments |
|---|---|---|---|
| Volatile solids (continued) | — | 81.0 | Central plant, Sacramento County, California, July 1977-June 1978 average |
| Grease and fat, percent by weight of dry solids | 5.0-12.0 | — | Ether extract |
| Cellulose, percent by weight of dry solids | — | 7.0 | Includes lignin |
| Protein, percent by weight of dry solids | 32-41 | — | — |

Wastewater treatment plants, therefore, currently are designed to minimize sludge production and all efforts are taken to stabilize and reduce its volume prior to disposal or utilization. Furthermore, increasing sludge disposal costs and diminishing landfill capacities are continually driving interest in sludge drying. As drying reduces the bulk and weight of sludge, transport and disposal costs are significantly alleviated. Drying process is highly energy consuming and hence very expensive.

Numerous sludge processing options have been proposed and have the potential to convert a fraction of organic material into usable energy, but only a few have been demonstrated to be viable net energy produced at full scale. Anaerobic digestion of sewage sludge is probably the most common process employed to date, about 25% of the available organic materials being converted to produce a gas rich in methane, resulting in an energy production of about 5 MJ/kg of dry sludge solids fed to the digester. Other alternatives, such as air incineration, gasification and liquefaction have recently been reported as viable technologies for net energy production from sewage sludge. Mostly to process woody and lignite agricultural wastes. There is very scant information on high nitrogen containing sludges.

The idea to use the processes of synthetic oil production from solid fuels for the treatment of various organic wastes, sewage sludge included, is based on the similarity of the chemical composition of the organic matter of these fuels and that of the waste products. Table 2 shows the elemental composition of various hydrocarbon sources and other substances present in diverse organic waste, including sewage sludge (lipids, proteins, hydrocarbons).

As can be seen from Table 2, all organic substances listed in it are composed of the same five elements in different concentrations. They differ in the structure and mass of their molecules. FIG. 2 shows the molecular models of the structure of an organic matter of bituminous coal, lignin (a natural polymer, which is a component of the wood structure) and organic components of the sewage sludge structure. It can be seen that the molecules under discussion are basically similar in structure.

They consist of ring-shaped aromatic and hydro-aromatic nuclei both single and condensed, linked by aliphatic or hetero-atomic cross links. Since such links have low energy of formation, they are the first to be destroyed by thermal treatment, and radical fragments are formed. The more said cross links there are in the structure of the material and the lower the energy of such links, the lower the temperature of their destruction point and the smaller the fragments they break into. The newly-formed fragments are chemically active radicals which in the absence of hydrogen combine (recombine) into heavy products and coke. With hydrogen from any source present, oil molecules are formed. FIG. 3 illustrates the above, which holds true for any solid fuel, including the organic matter of sewage sludge.

The process of obtaining synthetic oil from any solid organic feed consists of two basic stages:
 Thermal cleavage of the macromolecular structure, with radical fragments of different size formed;
 Stabilization of said radicals either through their recombination or through redistribution of hydrogen and alkyl groups in the feed stock structure, or through external introduction of hydrogen (molecular or donor).

TABLE 2

Variation in Elemental Composition of Different Types of Organic Matter

| Type of organic matter | Elemental composition, % wt daf | | | | | H/C atom. |
|---|---|---|---|---|---|---|
| | C | H | N | S | O | |
| Methane | 87.5 | 12.5 | — | — | — | 1.7 |
| Crude oil | 84.0-87.0 | 11.0-14.0 | 0.1-0.3 | 0.5-3.5 | 1.0-3.0 | 1.5-1.9 |
| Coal | 66.0-86.0 | 5.7-7.0 | 0.5-1.9 | 0.4-3.5 | 8.0-29.0 | 0.9-1.3 |
| Oil shale (kerogen) | 62.0-80.0 | 7.5-10.0 | 0.5-2.5 | 1.0-1.4 | 6.0-15.0 | 1.1-1.4 |
| Peat | 49.0-60.0 | 5.0-8.0 | 1.0-4.0 | 0.1-1.0 | 28.0-48.0 | 0.9-1.9 |
| Wood | 48.0-52.0 | 5.8-6.2 | 0.1-1.5 | — | 40.0-45.0 | 1.4-1.5 |
| Cellulose | 44.4 | 6.2 | — | — | 49.4 | 1.7 |
| Lignin | 63.0 | 6.0 | — | — | 31.0 | 1.1 |
| Fats | 76.0-79.0 | 11.0-13.0 | — | — | 10.0-12.0 | 1.7-2.0 |
| Albumin's | 50.0-55.0 | 6.5-7.5 | 15.0-18.0 | 0.3-2.5 | 21.5-23.5 | 1.7-1.8 |
| Sewage sludge | 23.0-44.0 | 4.5-6.0 | 2.5-7.5 | 0.3-1.8 | 16.0-24.0 | 1.2-1.7 |

It follows from the above that all thermo-chemical processes of obtaining synthetic oil essentially differ only in the methods by which the formed radical fragments are stabilized:

By pyrolysis—through redistribution of the hydrogen in the organic matter of the feed stock;

By hydro-pyrolysis and hydrogenation—through external introduction of molecular hydrogen;

By thermal extraction—at the expense of hydrogen donor from the recirculating solvent.

The advantage of the thermal extraction process as compared to the other processes mentioned above is that the recirculating solvent contains components which easily loose hydrogen (H-donors) at temperatures of the process. This donor hydrogen splits off the active atomic form and quickly and easily reacts with the radical fragments, stabilizing them in the form of liquid products.

FIG. 4 illustrates the importance of the presence of substances which act as hydrogen donors in the recirculating solvent and the principle of their interaction with the feed stock during the liquefaction process.

The naphthalene $\rightleftarrows$ tetraline $\rightleftarrows$ decaline transformation activates the hydrogen at much lower temperatures (e.g. 200° C.).

One of the major problems in direct solid fuels liquefaction processes is the separation of solids, mineral matter and unconverted organic matter from liquefaction products. Solid/liquid separation processes must be used to separate the mineral residue and unconverted carbon from liquid products. Difficulties in removing these solid components represent a major obstacle to economic production of liquefied feed stocks products.

Filtration, centrifugation, sedimentation, hydro-cloning and screening are all methods for mechanical separation of solid particulates from slurries. Thereto, other methods have been sought to solve the problem: vacuum distillation and extraction methods were used to separate liquid products from solid residue. The removal of micron-sized particles is difficult to achieve. One way of proceeding is as follows: the viscosity is decreased by blending with a relatively high amount (about 40-60% wt) of low viscosity liquid solvent so that the separation of the solids by centrifugation or filtration becomes possible. At a subsequent stage of the process, the solvent is recovered by distillation. However, centrifuges wear out quickly when used for the separation of the micron-sized particles. Filters are rapidly clogged by the fine material and have to be changed frequently, thereby making the process tedious and costly.

The main shortcoming of the separation methods mentioned above is that none of them ensures complete separation of the liquid products from the solid residue: 25-40% wt of the oil obtained in the liquefaction process remains absorbed in the pores of the solid residue.

Proceeding from what is described hereinbefore, the processes used for liquefying solid fossil fuels may be used to obtain liquid synthetic products from organic waste, sewage sludge included.

An example of thermal gasification system has been proposed by S. A. Virgil and G. Tchobanoglous in a paper entitled, "Thermal Gasification of Densified Sewage Sludge and Solid Waste", presented at the 53$^{rd}$ Annual Water Pollution Control Federation (WPCF) Conference at Las Vegas, Nev. USA in October 1980, while a laboratory scale system for liquefaction was disclosed at the above-mentioned Hartford Conference in a paper by P. M. Molton entitled, "Batelle Northwest Sewage to Fuel Oil Conversion", consisting of alkaline pretreatment of the sludge and subsequent autoclaving at 320° C. for one hour at about 10,000 KPa under an argon atmosphere. This last process produces oil, asphalt and char with reported oil yields of up to 15% by weight of total sludge solids, total thermal efficiency of up to 70%, and net energy production of about 5.9 MJ/kg, the latter figure being based on the assumption that the oil represents the net energy.

In another process described by W. L. Kranich, K. Guruz, and A. H. Weiss in a paper entitled, "Hydro-liquefaction of Sewage Sludge", published in the Proceedings of the National Conference on Municipal and Industrial Sludge Utilization and Disposal", Washington, D.C., U.S.A., May 1980, both raw and digested dry sludge were processed with a carrier oil in an autoclave at temperatures ranging from 396° C.-420° C. under hydrogen at 10,000-13,000 KPa. Oils and asphaltenes were produced, with oil yields of up to 30%.

A process for the conversion of sewage sludge to produce oils has been disclosed in European Patent Application No. 81109604.9 filed Nov. 10, 1981 by Prof. Dr. Ernst Bayer and published May 26, 1982 (Pub. No. AZ 0 052 334), and has been described by E. Bayer and M. Kutubuddin of Tubingen University, Federal Republic of Germany, in several articles, for example in "Oil aus Mull and Schlamm" on pages 68-77 of Bild der Wissenschaft, Issue 9 (1981); in "Oil aus Klarschlamm" on pages 377-381 of Abwasser, Issue 29 (1982); and in "Low Temperature Conversion of Sludge and Water to Oil" in the Proceedings of the International Recycling Congress, 1982, Berlin, Federal Republic of Germany. The process has been demonstrated on both batch and continuous laboratory scale systems, and basically comprises heating dried sludge slowly with the exclusion of air to a conversion temperature of 280° C.-600° C. for about 30-180 minutes, the vapors being condensed to generate a crude oil and the solid residue being coal-like. Significant advantages of the process are stated to be that it can be operated at only slightly above atmospheric pressure and no additives are required, the developers postulating that catalyzed vapor phase reactions occur in which the organic materials are converted to straight chain hydrocarbons, much like those present in crude oil. Analysis of the product is stated to confirm that aliphatic hydrocarbons are present in contrast to other known oil-producing processes, which appear to tend to produce aromatic and cyclic compounds, whether utilizing sludge, cellulose or refuse as the substrate. The developers state that they have demonstrated oil yields ranging from 18-27% and char yields from 50-60% the oil having a heating value of about 39 MJ/kg and the char of about 15 MJ/kg. Energy balance calculations indicate that the process is a net producer of energy, provided that the sludge is first mechanically dewatered to about 20% solids, and it has been estimated that a net energy production of 10-15 MJ/kg solids could be obtained in a full scale process.

This Bayer process is simple and in effect, mimics the natural process of oil synthesis. It is known that natural crude oil was formed from microscopic organisms over geologic periods of time, and comprises a mixture of saturated and unsaturated hydrocarbons including some non-hydrocarbon material. It is postulated by Bayer that at the levels of energy input used, with the exclusion of oxygen, the proteins and lipids in the sludge are converted to oil and the carbohydrates to coal-like material, the process being catalyzed if necessary by the addition of suitable materials. It is stated that in the case of sewage sludge it is in most cases superfluous to add a catalyst material, since the inorganic components present in the sludge contain a sufficient amount of catalyst in the form of silicates, aluminum compounds and transition metals. The hetero-bonds (C—S, C—N, C—P, C—O) are broken, but not the C—C bonds, resulting in a hydrocarbon mix very similar to natural crude oil. The research indicated that the maximum oil yield was achieved at an operating temperature of 280° C. to 320° C.

In a solid waste treatment process disclosed in U.S. Pat. No. 3,714,038, issued Jan. 30, 1973 to the Black Clawson Company, a slurry is formed of a mixture of the organic and inorganic materials are then removed. The slurry is dewatered and pyrolized or hydrogenated to result in a series of products such as gas, oil, char and residue.

U.S. Pat. No. 3,962,044, issued Jun. 8, 1976 to the Regents of the University of California, proposes a process for the treatment of solid animal and human excreta by particulating and heating it in a closed heating zone at 200-1000° C. (300-600° C. preferred) for a period of 15-120 minutes, when a part is volatilized and the solid residue is carbonized. The volatilized portion is removed to a recovery zone and condensable are condensed there from, it being separated into aqueous, non-aqueous and non-condensable fractions.

U.S. Pat. No. 4,030,981, issued Jun. 21, 1977 to H. V. Hess, W. F. Frang and E. L. Cole describes processes for making low sulfur oil by coking wastes, one of which is sewage sludge, at temperatures of 400-550° F. pressures of 300-3000 p.s.i.g., and times of 5 minutes to 2 hours and thereafter reacting the coked waste with hot pressurized synthesis gas (carbon monoxide and hydrogen), the synthesis gas reaction employing temperatures of 400° F.-550° F. pressures of 300-3000 p.s.i.g., and times of 5 minutes to 2 hours and thereafter reacting the coked waste with hot pressurized synthesis gas (carbon monoxide and hydrogen), the synthesis gas reaction employing temperatures of 500° F.-750° F. and pressures of 500-5000 p.s.i.g.

U.S. Pat. No. 4,098,649, issued Jul. 4, 1978 to Redken-Young Processes Inc. describes a process for destructive distillation of organic material separated, for example by flotation, from industrial and municipal wastes in which the material is delivered to a screw extruder conveyor which is heated to different temperatures in succeeding zones along its length, for example 40° F.-600° F. in a first zone and up to 1500° F. in subsequent zones, the resultant char being discharged. The gaseous products are removed separately from the different zones and separated, and may include olefins and paraffin's.

U.S. Pat. No. 4,210,491 issued Jul. 1, 1980 to Tosco Corporation also proposes the use of a screw conveyor as a retort for converting substances containing organic material into hydrocarbon vapors and solid residue, the volatile materials being removed at different points along its length and subsequently processed. The retort conveyor is heated by a fluidized bed.

U.S. Pat. No. 4,344,770 issued Aug. 17, 1982 to Wilwardco Inc. discloses a process and apparatus intended principally for the hydrolysis treatment of sawdust and wood chips, but applicable also to sewage sludge. The separated gases are condensed to liquid and gas phases and the liquid phase is then separated by gravity into water and oil fractions. The water fraction is distilled to separate water soluble oils and they are added to the oil fraction to increase its energy content.

Canadian Patent No 1,075,003 issued Apr. 8, 1980 to Karl Klener describes a process for the production of combustible gas from waste materials, including sewage sludge, requiring drying of the material, its carbonization at low temperature (300-600° C.) in a first series of rotary tubes, separation of the resultant combustion components and conversion of the low temperature carbonization gases in a reaction bed of solid carbon at high temperature (1000-1200° C.).

Canadian Patent No 1,100,817 issued May 12, 1981 to Ahlstrom (A) Osakeyhtiz discloses a method of treating material, such as sewage sludge, in a fluidized bed reactor for its incineration, the process employing mechanical dewatering to achieve a high enough solids content for the process to be autogenous and not to require supply of auxiliary fuel. It is not always possible to remove sufficient water mechanically and the thus-dried material is fed first into a pre-reactor into which is passed hot separated solids removed from the main fluidized bed reactor, these hot solids being mixed thoroughly with the sludge in the pre-reactor to heat and dry it before it passes to the main reactor.

Canadian Patent No. 1,001,493, issued Dec. 14, 1976 to Phillips Petroleum Company, USA discloses a two-stage incinerator for waste products, such as sewage sludges. In the first stage vaporization or volatilization is achieved with some combustion occurring, and then all the gaseous products are conducted to a second stage in which further oxidation and combustion occurs, the hot flue gases from the second stage being quenched with cool air to provide preheated air for the combustion in either or both of the two stages.

U.S. Pat. No. 4,618,735 issued Oct. 21, 1986 to T. R. Bridle and H. W. Campbell disclosed a new process for the conversion of the organic components of sludge, particularly sewage, to produce useful, storable, energy-containing oil products, apparatus for carrying out the process and a control process for optimization of the process temperature. The sludge preferably is mechanically dewatered to about 20-25% solids by weight and thermally dried to about 90% solids by weight. The resultant material is comminuted and heated in the apparatus of the invention to at least 250° C. in a heating zone in the absence of oxygen to generate a gaseous atmosphere containing volatiles; this atmosphere is then removed, scrubbed of $H_2S$ and $NH_3$ if required, and passed preferably in countercurrent flow in a intimate contact with the "devolatilized" sludge solids from the heating zone, again in the absence of oxygen, at a temperature of at least 280° C., resulting in catalyzed vapor phase oil-producing reactions. The oil vapors are carried out by the gas flow and condensed.

The apparatus moves the sludge solids co-current with the heating zone atmosphere and countercurrent with the reaction zone atmosphere. In the reaction zone the conveyor not only moves the comminuted sludge along but lifts it and drops it through the gaseous atmosphere of the preferred intimate contact. Preferably the sludge is examined repeatedly by differential scanning calorimetry to generate a thermogram which has been found to reveal immediately the optimum temperature for of the reaction zone, and also the anticipated oil yield from the sludge.

A practical problem with many of the proposed and employed hitherto, particularly those involving pyrolysis and incineration, is that the principal usable energy-containing products are gases, often not easily condensable, and of low net energy content, so that they are impossible or uneconomic to store and must be used immediately. Generally it is only practicable to use them to produce relatively low grade energy, such as steam, and flare them to waste during periods of little or no demand. There is a growing demand for processes that result in storable (liquid or liquefiable), transportable and if possible upgradeable energy or chemicals containing products, such as synthetic oils, with efforts directed to the optimum production of net storable energy of fine chemicals and with the non-storable products, if used at all, used in the operation of the process.

U.S. Pat. No. 7,276,148 by the present inventor, incorporated herein by reference, describes a combined thermal extraction/pyrolysis multi stage process for the conversion of the sludge, particular sewage sludge by heating and chemically reacting, in order to obtain a useful storable product therefrom, such as oils, in yields greater than obtained only in pyrolysis processes. It is known that during solid fuel pyrolysis, both the liquid and the gaseous products of the process leave the reactor in the vapor phase and are thus separated from the solid residue. This advantage was used of pyrolysis to separate the liquid products that are formed at the stage of thermal extraction of the feed stock.

The main disadvantage of said process is that the part of the liquid products, especially of the heavy fractions, which were created at the extraction stage, are transformed into coke at the pyrolysis stage at temperatures>400° C. This causes to loss of the part of liquid products, which were transferred into coke.

A comparative Table 3 below illustrates the advantages and disadvantages of the two methods of sewage sludge liquefaction—thermal extraction and pyrolysis.

As can be seen from Table 3 data, pyrolysis process convert part of liquid products (basically heavy fractions) to coke, which leads to yield decreasing.

TABLE 3

Advantages and Disadvantages of Liquefaction Methods.

| Liquefaction method | Advantages | Disadvantages |
| --- | --- | --- |
| Thermal extraction in H-donor solvent medium | 1. High yield of liquid products. 2. Absence of pyrolytic water in products. 3. Higher conversion of sewage sludge O.M. into liquefied products. | 1. The need to separate liquid products from solid residue. 2. Lower calorific value of products. |
| Pyrolysis | 1. Higher calorific value of products. 2. Separation of liquid products in vapor phase. | 1. Low yield of liquid products. 2. Conversion of part of organic matter into pyrolytic water. 3. Conversion a part of liquid products into coke. |

SUMMARY OF THE INVENTION

Accordingly, there is a long felt need for an improved process for converting sewage sludge to fuel and crude oil which provides improved yields and higher energy efficiency.

It therefore a purpose of the present invention to provide an improved process for the conversion of sewage sludge to fuel and crude oil.

According to a further aspect of the present invention it is a purpose to provide a fuel product obtained from the improved process hereinafter described and claimed.

The present invention provides a liquefaction process of organic waste comprising the following steps:

a. drying the sewage sludge waste to reduce the water content to below 15%;
b. mixing of dried sewage sludge with solvent medium for slurry preparation;
c. subjecting slurry from step (b) to a thermo-chemical liquefaction process in the presence of a solvent medium at a temperature of about 275° C. to 375° C. and a pressure of up to 10 atmospheres, thereby obtaining gaseous, liquid and solid products in the form of Slurry Product 1, wherein said solvent medium is optionally from a solvent recirculating stream;
d. separating the formed Slurry Product 1 to Slurry Product 2 and to condensable gas which contain water and other liquid fractions boiling out at up to 250° C.;
e. Steam Stripping of Slurry Product 2 at temperatures from 250° C. up to 400° C., preferably 300-350° C.,
separating therefrom liquid products from solid residue by converting said liquid products to the vapor phase, thus obtaining Mix Vapors and Solid Char;
f. cooling and separating said Mix Vapor phase obtained in step (e), obtaining two separate streams of oil and water;
g. subjecting the oil product obtained in step (f) to vacuum distillation for the recovery of fractions having a boiling temperature of between 250° C. to 350° C.; and recirculation of the remaining fraction having a boiling temperature of above 350° C. as the recirculating solvent medium for step (b).

Optionally, the Fuel Gas from stage (d), the Solid Char from stage (e) and Heavy Oil from stage (g) are combined and employed as a combustion source in heat energy generation, wherein said energy is utilized in said process.

According to yet a further aspect of the invention there is provided a fuel product comprising oil distillates having a boiling temperature up to 250° C. (Light Oil) and of between 250° C. to 350° C. (Middle Distillate) obtainable according to the presently described process.

In the process of the present invention, the Slurry Product 1 obtained at the stage of Thermal Extraction (c) at temperatures of up to 350° C. is transferred to (d) stage treatment. Following separation of Vapors to non-condensable gases (Fuel gases), water and Light Oil fractions (boiling at <250° C.), the Slurry Product 2 is throttled to the top of Steam Stripping column (e). The temperature in said column is kept at 250° C.-400° C., preferable 300-350° C. by feeding of steam counter-flow. The combined effects of the steam and heat, or temperature, cause organic liquid material to transfer from the liquid to the vapor phase. This mixed vapor phase (Mix Vapors) leaves the top of the stripping column and the solid residue (Solid Char) leaves the bottom of the column.

A flow chart of the combined process according to this invention is given in FIG. 5.

Because the temperature of the stripping process doesn't exceed 400°, the coking process, which is typical for the pyrolysis processes, do not take place, while the liquid products from the thermal extraction stage are fully separated from the solids. The yield of the liquid products by the combined process isn't reduced comparing to same yield after the liquefaction stage.

Thus, the technological problem of separating the liquid products from the solid residue is solved and said products leave the steam stripping column in the vapor phase which is condensed in an additional separator.

The liquid products separated at stage (f) are transferred to Vacuum Distillation (g) where products boil at temperatures of up to 350° C. are separated and the residue of heavy products boiling at temperatures>350° C. is directed as the recirculating solvent to the stage of Slurry Preparation (b).

In preferred embodiments of the present invention said recirculating solvent medium is a liquid product with a boiling temperature of above 350° C.

As explained herein in preferred embodiments of the present invention said recirculating solvent medium serves as a hydrogen donor in step c.

In especially preferred embodiments of the present invention said organic waste is sewage sludge.

Preferably in the process of the present invention said waste is dried to reduce the water content to below 12%.

In especially preferred embodiments of the present invention the ratio of solvent to dried sewage sludge is preferably between 0.75:1 and 1.5:1 and most preferred is a ratio of about 1:1.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the present invention sewage sludge liquefaction is conducted according to the following stages: the thermal extraction stage is conducted in a recirculating solvent medium wherein said solvent performs several functions:

- formation of slurry, which facilitates the pumping of the feed stock through the apparatus;
- improvement of the heat transfer from the heating agent to the feed stock;
- hydrogen donation in order to recombine the radical fragments formed during the thermal destruction of organic molecules in the feed stock;
- dissolution of the resulting fragments in the liquefaction medium.

The presence of the recirculating solvent thus provides for a higher yield of liquid products compared with the processes of pyrolysis known in the literature, and for lower temperature of the treatment (pyrolysis at 450° C.-550° C., thermal extraction at 250° C.-350° C. for sewage sludge).

The slurry product obtained at the first stage after separating the non-condensed gases, water and light fraction of the liquid product is a mixture of spent sewage sludge bearing unconverted organic matter, liquid recirculating solvent and newly formed liquid products. Complete separation of the liquid part of the mixture from the solid spent sewage sludge is technologically difficult since the known solid/liquid separation methods, such as filtering, centrifuging, vacuum distilling, etc., all fail to achieve complete separation. Approximately 25-35% wt of liquid products remain absorbed in the pores of the spent sewage sludge particles.

To obtain complete separation and additional yield of liquid products, this invention offers a method wherein after the stage of liquefaction, Slurry Product 2 is directed into a steam stripping column with the temperature in said column is in the range from 250° C. to 400° C., which makes it possible to achieve the transformation of the liquid products into mix vapor phase and their separating from the solid residue.

Figure 5:
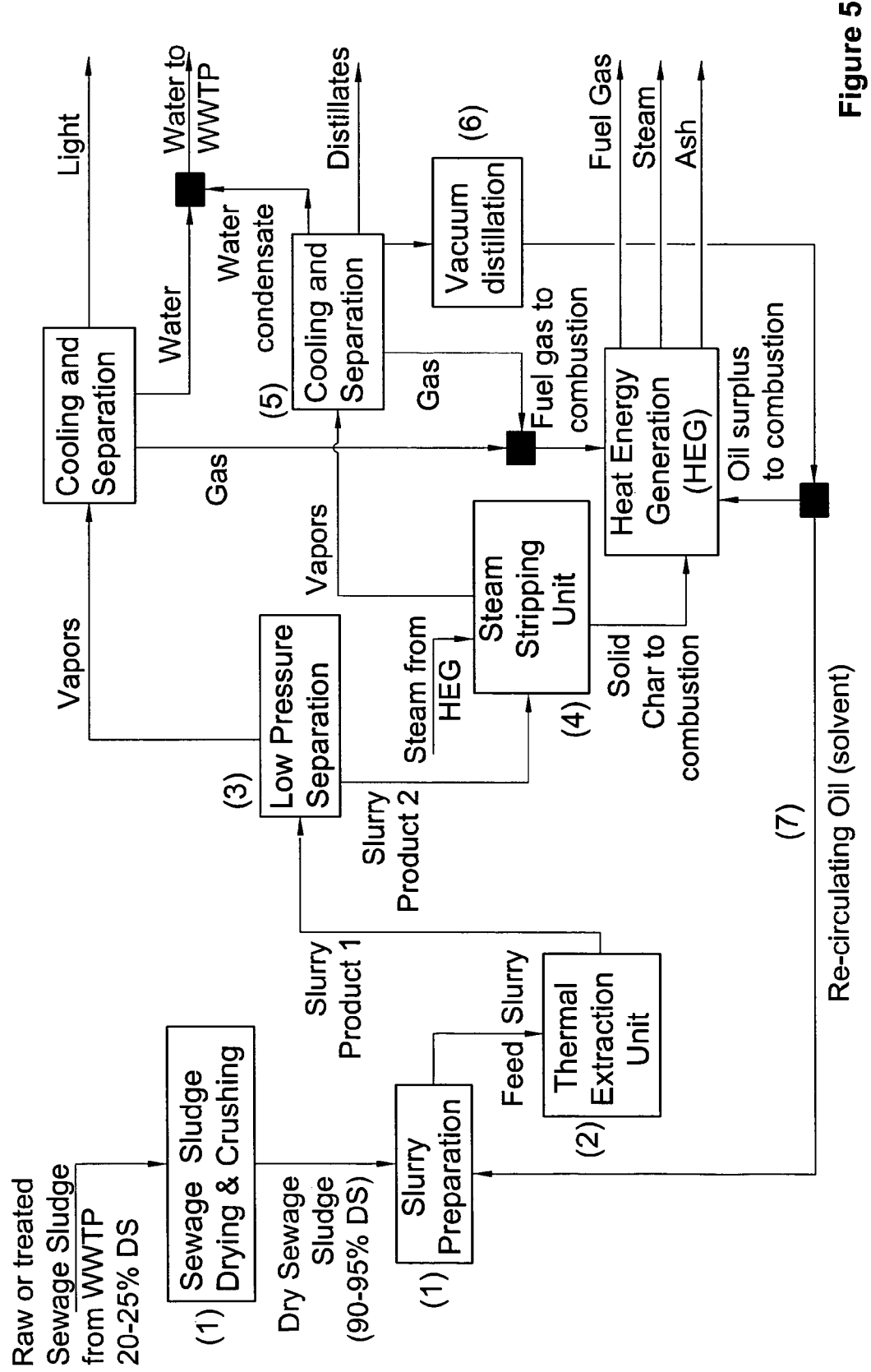
FIG. 5—a schematic flow chart of the sludge liquefaction process of the present invention.

According to the present invention, a process is provided for conversion of sludge, particularly sewage sludge, comprising the following steps (FIG. 5):

1. Feed slurry preparation, which includes dewatering of sewage sludge by a known technology (for instance, offered by the US Filter firm), with gaseous, solid and, if necessary, part of the liquid products of the process offered in this invention being used as fuel to obtain heating agents; comminuting said dewatered sewage sludge and mixing it with recirculating solvent into a homogeneous slurry.
2. Heating said slurry in the reactor at temperatures from 275° C. to 360° C. and pressure of up to 1.0 MPa (10.0 atm), for the purposes of thermal extraction. This is essentially breaking up the sewage sludge organic matter into radical fragments, stabilizing said radical fragments at the expense of donor hydrogen from the solvent and subsequently removing them in vapor and liquid phases.

3. Product separation at the thermal extraction reactor output is actually separation of water, of the liquid product fraction with final boiling point 250° C. and non-condensable gaseous products.
4. Steam stripping of the reaction mass remaining in the thermal extraction reactor after treatment as per step 3, at temperatures from 250° C. up to 400° C. (preferably 300-350° C.) with separating liquid products from solid residue in the vapor phase. As contacting proceeds down the unit, the slurry becomes leaner in the liquid material, while the vapor phase becomes more enriched as it moves up the unit.
5. Removing the mix vapor products with further condensation and separation of oil product and water.
6. Vacuum distillation of oil products from step 5 for the removal of product fraction 250° C.-350° C.
7. Recirculation the remaining fraction >350° C. (as recirculating solvent) of stage (6) to stage (1) to feed Slurry Preparation.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Throughout the description the terms "organic waste", "urban sewage", "urban waste", "sewage sludge" and "sludge" are used synonymously.

Figure 7:
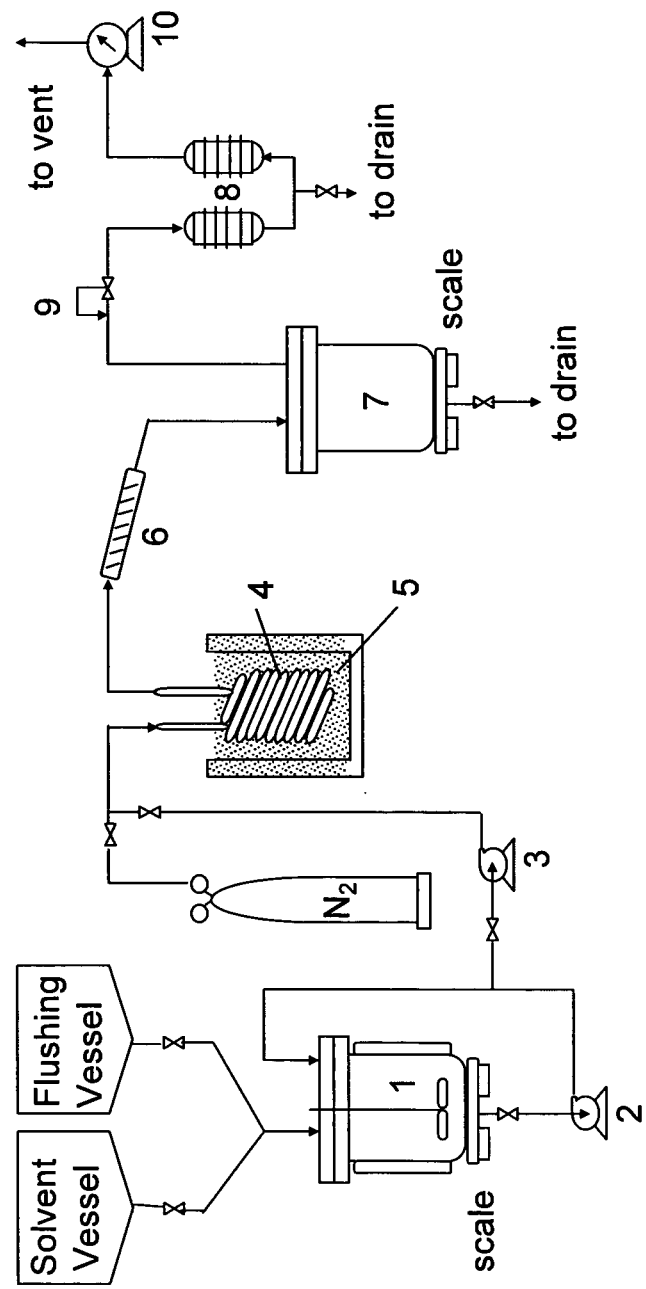
FIG. 7 is a schematic flow sheet of the thermal extraction unit. To perform an experiment on this unit, a mixture of dried sewage sludge and the solvent is prepared beforehand in the required proportion and quantitatively placed into slurry preparation vessel 1, said vessel comprising a mixer, a heating jacket and a recirculation pump 2. Heating, the recirculation pump and the mixer are turned on—all of obtaining a homogeneous slurry and preventing the precipitation of solid particles. Once the homogeneous slurry is obtained, feed pump 3 is activate, which transports the feed-slurry into reactor 4, already preheated to set reaction temperature with the aid of fluidized bed sand bath 5. The flow rate is set by adjusting feed pump 3, while pressure in the system during the experiment is set by blowing with gaseous nitrogen and sustained by back pressure regulator 9. After passing through the reactor, the reaction mixture goes to cooler, which is cooled by running water, and then collected in separator vessel 7 where it is cooled completely. The non-condensable gases then leave separator vessel 7, pass through cold trap 8, where liquid fractions captured by the gas flow are trapped and thrown out the gasometer 10 to vent. Slurry preparation vessel 1 and separator vessel 7 are installed on scales, and the gasometer is equipped with a gas sampler, which makes it possible to receive data for substance balance at the end of the experiment.

Thermal extraction stage was performed in the related unit (FIG. 7). When the homogeneous slurry is obtained, feed pump 3 is activated, which transports the feed-slurry into reactor 4, already preheated to set reaction temperature with the aid of fluidized bed sand bath 5. The flow rate is set by adjusting feed 3 pump, while pressure in the system during the experiment is set by blowing with gaseous nitrogen and sustained by back pressure regulator 9.

After passing through the reactor 4, the reaction mixture goes to cooler 6, which is cooled by running water, and then collected in separator vessel 7 where it is cooled to ambient temperature. The non-condensable gases then leave separator vessel 7, pass through cold trap 8, where liquid fractions captured by the gas flow are trapped and thrown out the gasometer 10 to vent. Slurry preparation vessel 1 and separator vessel 7 are installed on scales, and the gasometer is equipped with a gas sampler, which makes it possible to receive data for substance balance at the end of the experiment.

The sewage sludge employed in the determination of process data using the continuous and batch-type apparatus of FIG. 6, 7 respectively, which will be described below, is activated sewage sludge obtained from WWTP of Jerusalem. Proximate and ultimate analysis data is represented in Table 4.

TABLE 4

Ultimate and Proximate Analysis of the Sewage Sludge.

| Moisture, | Volatile solids, | Calorific value, | Elemental analysis, % wt/% wt daf | | | | |
|---|---|---|---|---|---|---|---|
| % wt | % wt, db | Kcal/kg, db | C | H | N | S | $O_{diff.}$ |
| 79.0 | 68.5 | 3631 | 37.97 | 5.80 | 5.49 | 0.30 | 18.94 |
|  |  |  | 55.43 | 8.47 | 8.01 | 0.44 | 27.65 |

The sewage sludge was oven dried at 105° C. to about 100% solids, ground to a particle size of less then 0.75 mm for batch-scale experiments and of less then 0.25 mm for continuous operating tests, mixed with solvent in an appropriate ratio, and the mixture was immediately used in experiment.

Figure 6:
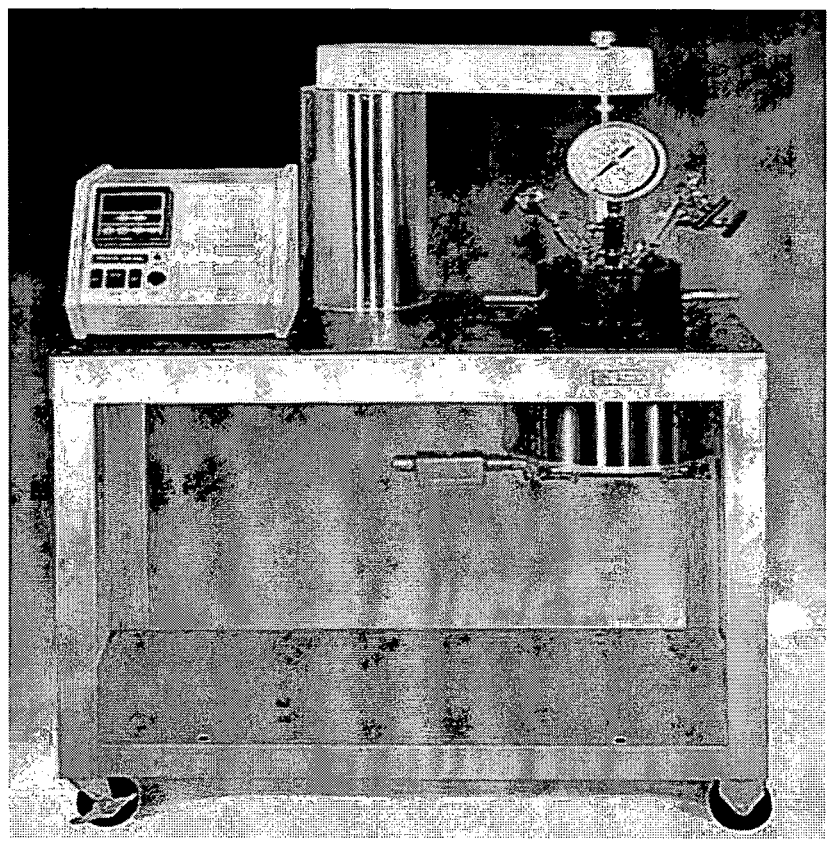
FIG. 6—a 1000 ml high pressure/high temperature (HP/HT) stirred reactor. This HP/HT system provides means for conducting pre-pilot plant studies and for producing complex chemicals in more reasonable quantities then are usually available in laboratory reactors. The unit is completely equipped with all necessary fittings for handling and mixing liquids, slurries and gases under heat and pressure with vigorous stirring, including provisions for adding or withdrawing gas or liquid during a procedure. An automatic temperature controller with appropriate safety features and optional devices for monitoring the reaction pressure and temperature is furnished.

Prior to the operation of the continuous thermal extraction process unit of FIG. 7 a batch reactor unit of FIG. 6 was used to generate process data. For autoclave experiments the pretreated sludge was loaded into the autoclave, the lid was fastened and the reactor was blown down with nitrogen three times to create inert atmosphere. Then the mixer and the controller-set heating program were activated. After the program was complete, heating was turned off and cooling turned on. When cooling ended the uncondensed gas was withdrawn through the gas outlet valve and gasometer to determine the volume of the gas obtained. During gas withdrawal samples were taken for G.C. analysis. Then the autoclave was opened and its content washed quantitatively with a great amount of the tetrahydrofuran (THF) solvent into a vessel, transported to the Soxhlet apparatus thimble and washed with THF till the liquid products were fully separated from the solid residue. The solid residue as oven-dried at 105° C. to remove THF and then weighted. The THF oil extract was distilled by rotavapor to separate liquid products from the solvent (THF) and weighed.

Continuously operating unit for thermal extraction shown in FIG. 7 was described previously.

Figure 8:
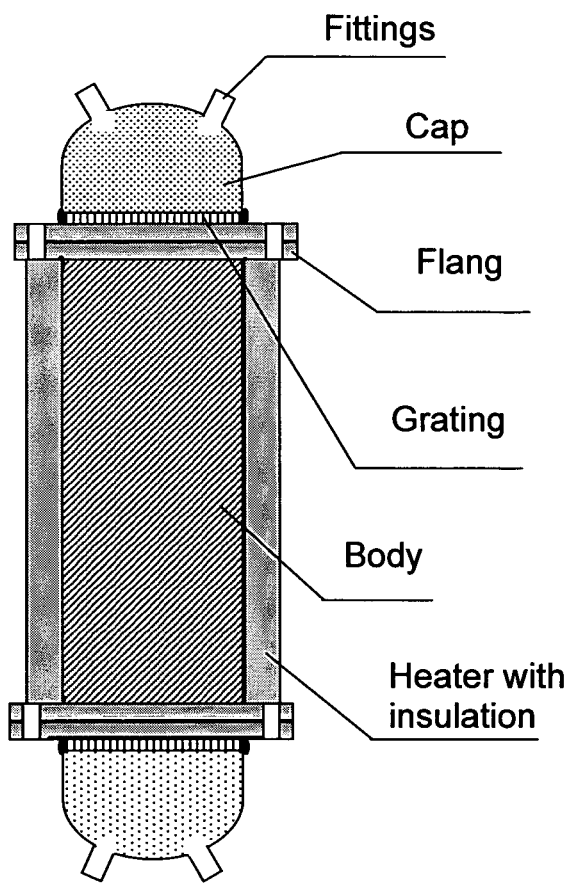
FIG. 8 is a steam stripper apparatus for simulating tests on liquid/solid separation. Cylinder part of apparatus is filled by slurry product after water and fraction <250° C. boiling. From the bottom of apparatus preheated steam is throttled. Mixed oil/steam vapors leave the top of apparatus and condense in special separator.

While the process of the present invention is preferably conducted in a continuously-operating unit as a combined continuous process, said process may also be conducted wherein each stage of the process is carried out separately: the thermal extraction stage in autoclave (FIG. 6) or a continuous unit (FIG. 7) and the steam stripping stage of the slurry product obtained at the first stage, in the steam stripping apparatus (FIG. 8).

The dried comminuted sludge is mixed with suitable solvent in the necessary ratio and placed into slurry preparation vessel 1 to obtain slurry (FIG. 7). After the slurry is stabilizes by heating, stirring and recirculating, it is pumped by the feed pump 3 into reactor 4, which has been preheated to a set temperature. The residence time spent in the reactor 1 is regulated by the rate of flow through the feed pump.

In the reactor 1 the sewage sludge is converted into a mixture of slurry product and the gases produced in the process. From the reactor 1 said mixture goes to separator vessel 7, where it is cooled and vapor are condensed. The uncondensed gas is released through the cold traps where the remaining liquids are trapped, then it passes though the gasometer and is thrown to vent.

The slurry product collected in the separator vessel is vacuum-distilled. In one example said vacuum distillation is carried out in a laboratory unit and the liquid products having the boiling point at ≦250° C. are separated.

The residual slurry product is placed into the column of the steam stripping apparatus for liquid/solid separation.

Thermal Extraction Process Performance in the Batch Reactor.

solvent ratio. As seen from Table 5, the liquid product yield closest to tetralin was received in the solvent medium obtained by pyrolysis of sewage sludge and distilled in the 300-350° C. range (experiments TE18, TE19 and TE20). The highest yield of liquid products was registered in the TE18 experiment (50.7% wt).

TABLE 5

Thermal Extraction experiments (autoclave tests).

| Test code | Feed stock, g | Solvent, g | T, °C. | Residence time, min | Receipt, g | | | Yield of products, % wt | | |
|---|---|---|---|---|---|---|---|---|---|---|
| | | | | | Oil | Gas | Residue | Oil | Gas | Residue |
| TE1 | SSdry, 60 | Tetraline, 30 | 300 | 20 | 28.70 | 2.89 | 28.41 | 47.80 | 4.80 | 47.40 |
| TE2 | SSdry, 60 | Tetraline, 45 | 300 | 20 | 29.42 | 3.68 | 26.89 | 49.00 | 6.20 | 44.80 |
| TE3 | SSdry, 60 | Tetraline, 78 | 300 | 20 | 28.80 | 3.48 | 27.72 | 48.00 | 5.80 | 46.20 |
| TE6 | SSdry, 60 | Tetraline, 60 | 275 | 20 | 27.21 | 2.75 | 30.04 | 45.40 | 4.60 | 50.10 |
| TE4 | SSdry, 60 | Tetraline, 60 | 350 | 20 | 31.01 | 4.41 | 24.58 | 51.70 | 7.40 | 41.00 |
| TE5 | SSdry, 60 | Tetraline, 60 | 375 | 20 | 30.86 | 5.51 | 23.63 | 51.40 | 9.20 | 39.40 |
| TE7 | SSdry, 60 | SO/1, 60 | 275 | 20 | 85.54 | 3.38 | 31.08 | 42.60 | 5.60 | 51.80 |
| TE8 | SSdry, 60 | SO/1, 60 | 300 | 20 | 87.10 | 4.45 | 28.45 | 45.20 | 7.40 | 47.40 |
| TE9 | SSdry, 60 | SO/1, 60 | 325 | 20 | 87.38 | 5.06 | 27.56 | 45.60 | 8.40 | 45.90 |
| TE10 | SSdry, 60 | SO/1, 60 | 350 | 20 | 88.49 | 4.96 | 26.55 | 47.50 | 8.30 | 44.30 |
| TE13 | SSdry, 60 | SO/1, 60 | 375 | 20 | 86.80 | 6.50 | 26.70 | 44.70 | 10.80 | 44.50 |
| TE11 | SSdry, 60 | Mazut, 60 | 300 | 20 | 85.03 | 4.68 | 30.29 | 41.70 | 7.80 | 50.50 |
| TE12 | SSdry, 60 | Mazut, 60 | 350 | 20 | 86.95 | 5.28 | 27.77 | 44.90 | 8.80 | 46.30 |
| TE14 | SSdry, 60 | Mazut, 60 | 375 | 20 | 87.09 | 5.91 | 27.00 | 45.20 | 9.90 | 45.00 |
| TE16 | SSdry, 60 | SO/2, 60 | 325 | 20 | 89.10 | 4.64 | 26.26 | 48.50 | 7.70 | 43.80 |
| TE15 | SSdry, 60 | SO/2, 60 | 350 | 10 | 89.14 | 5.32 | 25.54 | 48.60 | 8.90 | 42.60 |
| TE17 | SSdry, 60 | SO/2, 60 | 350 | 20 | 89.34 | 4.91 | 25.75 | 48.90 | 8.20 | 42.90 |
| TE19 | SSdry, 60 | SSO/5, 60 | 300 | 20 | 89.17 | 4.31 | 26.52 | 48.60 | 7.20 | 44.20 |
| TE18 | SSdry, 60 | SSO/5, 60 | 350 | 20 | 90.43 | 5.82 | 23.75 | 50.70 | 9.70 | 39.60 |
| TE20 | SSdry, 60 | SSO/5, 60 | 375 | 20 | 87.54 | 6.82 | 25.64 | 45.90 | 11.40 | 42.70 |

The operation conditions and results of the tests are shown in Table 5, the elemental analysis of the obtained oil and solid residues are shown in Table 6, and gas volume and composition for each test are shown in Table 7. All the data in the Tables is presented on the basis of dry sludge.

Effect on Solvent Origin

Figure 1:
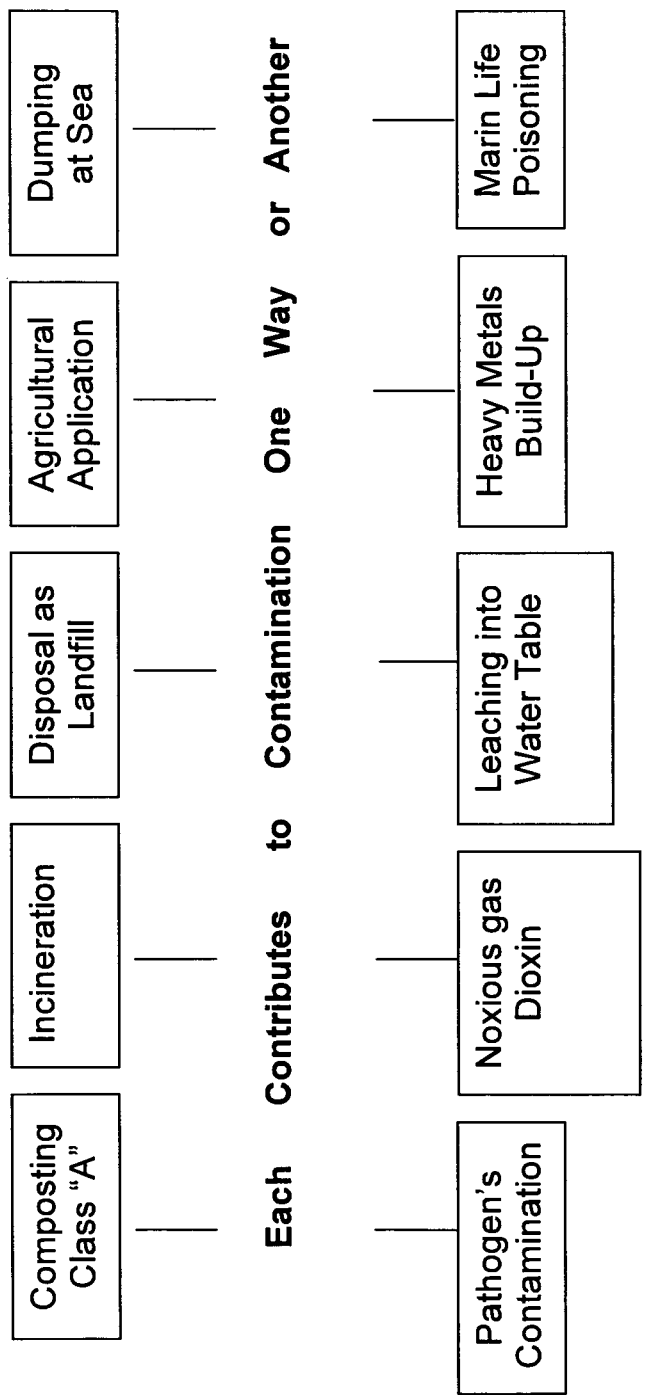
FIG. 1—a schematic representation of ways of disposing of sludge material and their disadvantages, as known in the art.
Figure 2A:
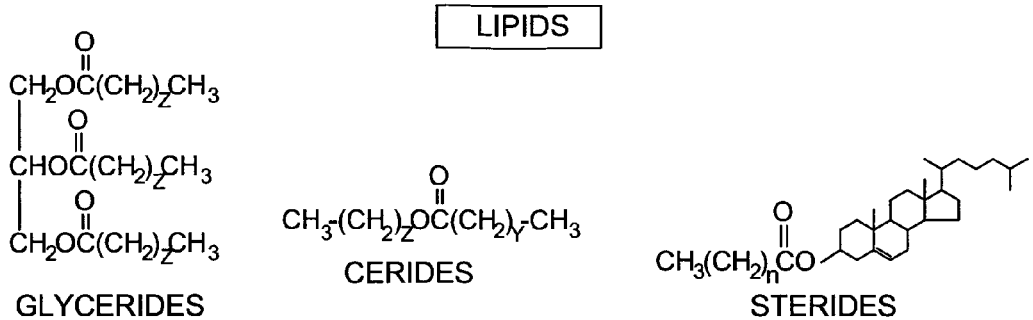
FIG. 2—molecular models of the structure of bituminous coal, lignin and organic components of sewage sludge.
Figure 2A:
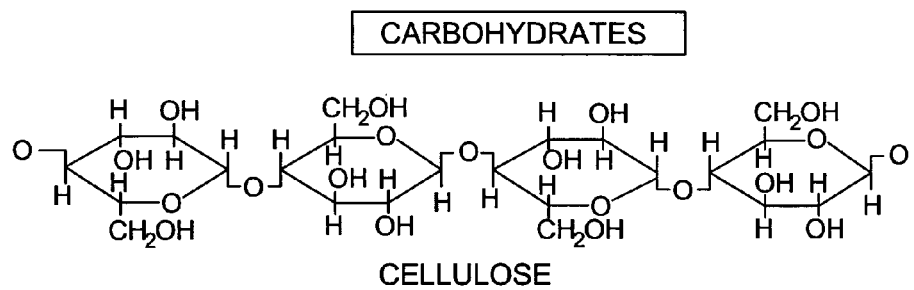
Figure 2A:
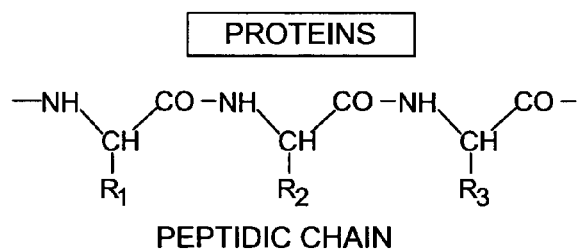
Figure 2A:
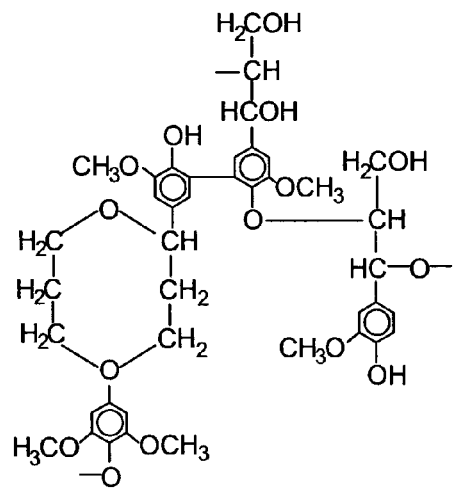
Figure 2B:
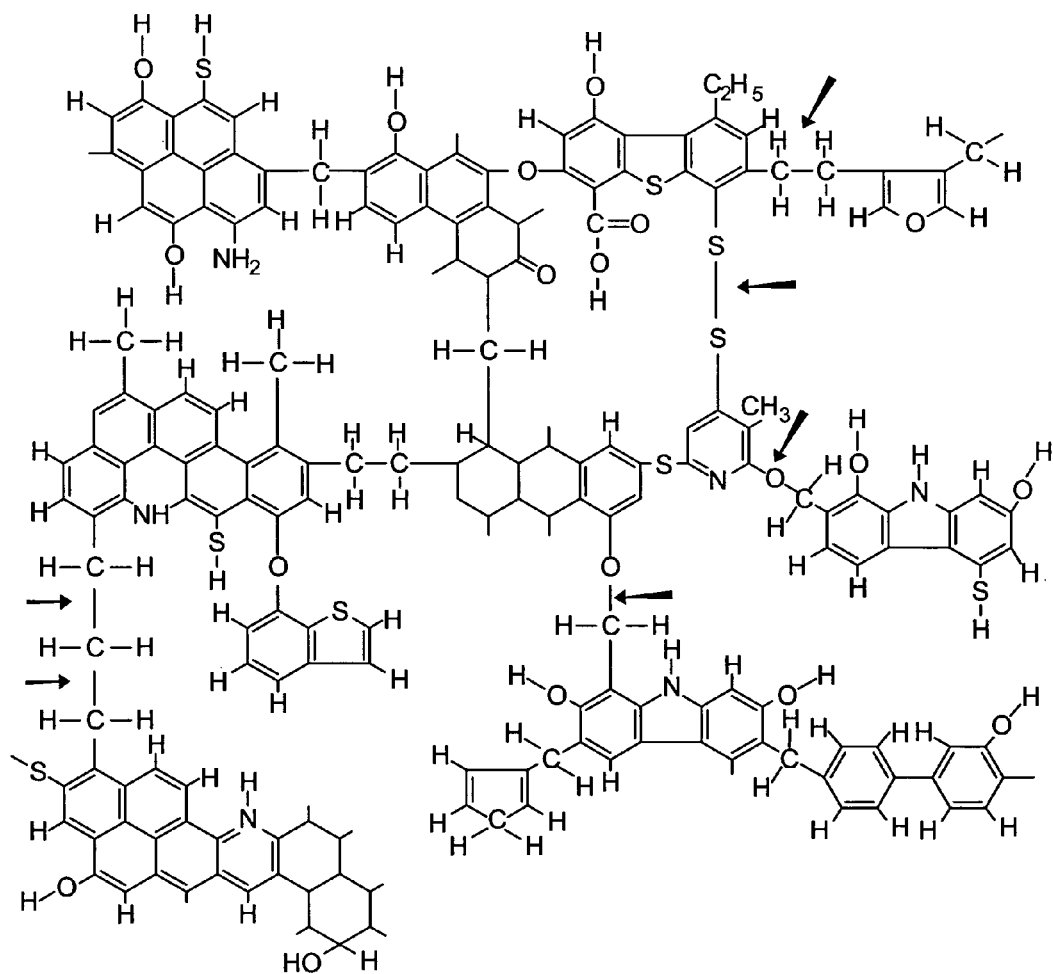
Figure 3:
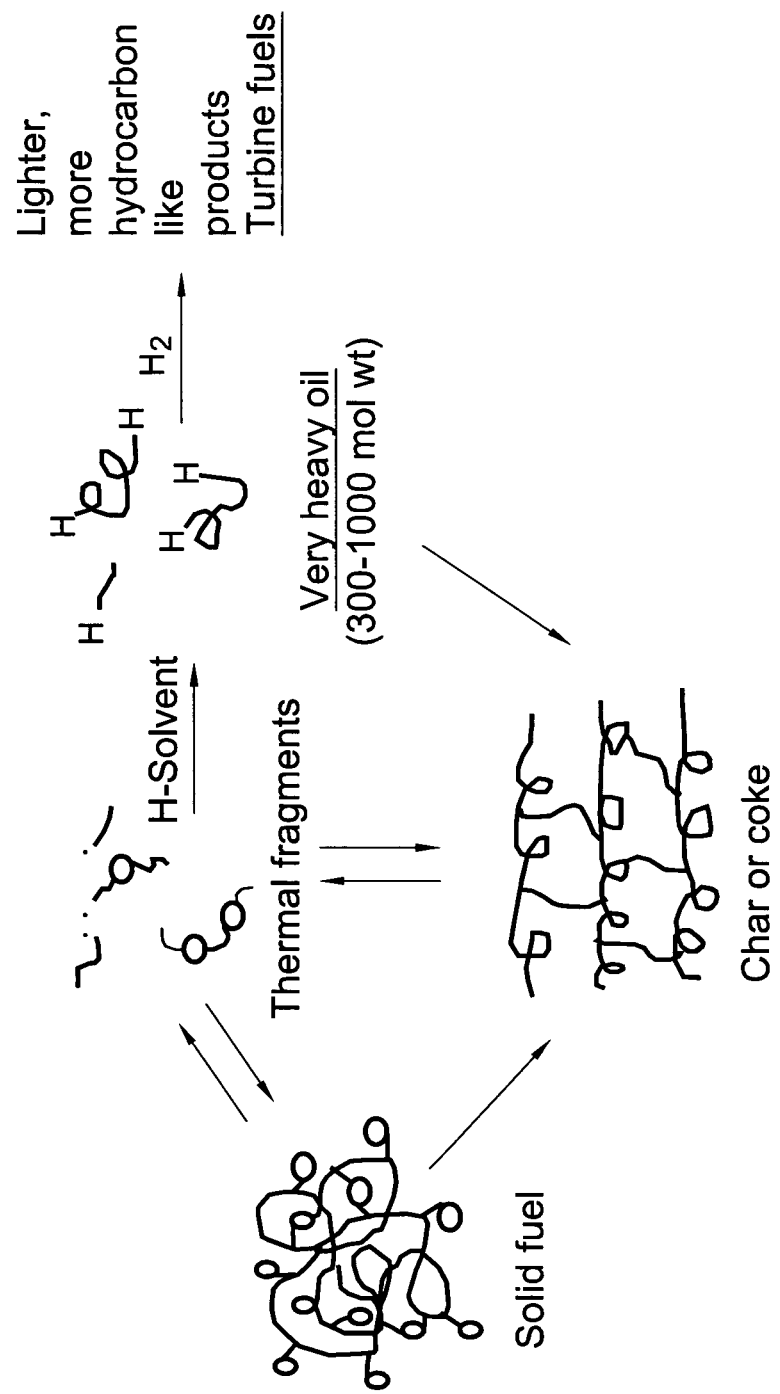
FIG. 3—a representation of the chemistry in solid fuel conversion.
Figure 4:
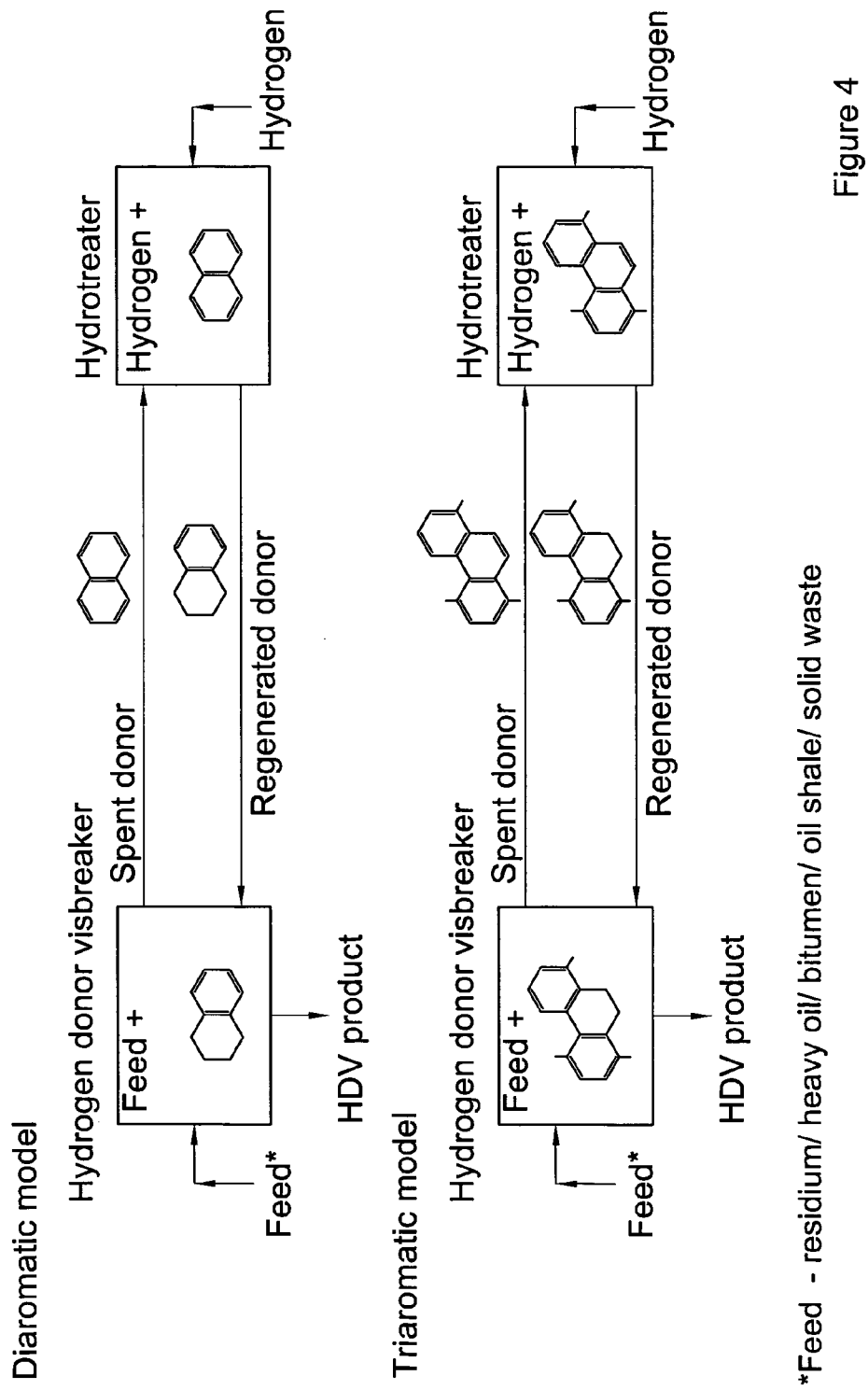
FIG. 4—reaction scheme chemistry in the presence of a hydrogen donor.

The quality of the solvent universally known to be of major importance for obtaining high yields of liquid products in the process of their thermal extraction from solid fossil fuels. The function of the H-donor recirculating solvent was discussed previously. When studying the thermal extraction process, tetralin is used as a model solvent; its chemistry was described and is illustrated in a diagram (FIG. 4). Therefore the first experiments to determine the limits of the process parameters were conducted with tetralin as solvent (experiments 1-6, Table 5). In these experiments, the variable parameters were temperature and the feed stock/solvent ratio. The experiments with tetralin (experiments 1-6) have shown that the best results are received at 350° C. and 1:1 feed stock/solvent ratio (TE4 experiment).

As is known in the professional literature, fractions of crude oil, shale oil or syn-crudes obtained from coal are used as H-donor solvents to liquefy solid fuels by thermal extraction in the H-donor solvent medium. As a rule, the recirculating solvent is a certain fraction or mixture of several fractions of the liquefied product proper.

Such a solvent has the highest H-donor activity for the said feed stock and the highest solubility toward the newly formed liquid products. Therefore, solvents of different origin were used in the experiments described. Table 8 provides the element composition of the various used in said experiments.

The experiments with said solvents were conducted in the 275-375° C. temperature range and with the 1:1 feed stock/

Tables 6 and 7 show, respectively, the elemental composition of the liquid and solid products and the composition of the gas released during the experiments. The tables also give the computed calorific value of the products obtained. The calorific value was computed from the Mendeleyev formula for gaseous products (Kcal/kg):

$$Q=(30.4CO+20.8H_2+85.3CH_4+143.2C_2H_4+136.0C_2H_2+170.0C_nH_m)/q$$

in which $CO$, $H_2$, $CH_4$, $C_2H_2$ and $C_nH_m$ is the percent of the respective gases by volume; where q is density of the gas mixture, $kg/m^3$.

For liquid and solid products (kcal/kg):

$$Q=81C+300H-26(O-S)-6(9H+H_2O)$$

in which C, H, S, O and $H_2O$ is the percent of said elements and water in the product by weight.

As can be seen from Tables 6 and 7, the composition of the product sufficiently depends on the conditions in which the experiments were conducted, especially on temperature. With the raising of the temperature, the H/C ratio in the liquid products and the calorific value increased (experiments TE18, TE19 and TE20), while the H/C ratio and the calorific value of the solid residue decreased. In the gaseous products (Table 7), heating brings the $CO_2$ share in the gas down while the share of combustible gases ($H_2$, CO and $C_nH_m$) and their calorific value is correspondingly rising.

The thermal extraction stage was tested in a unit shown in FIG. 7, the operation said unit was described above. The slurry product obtained in this unit was transported to a vacuum-distilling apparatus in which water and the liquid product function boiling up to 250° C. were distilled off. The residual slurry product was then transported to the steam stripping apparatus for solid/liquid separation Steam Stripping Process Performance in the Batch Column (FIG. 8)

200 gr of slurry product 2, obtained after thermal extraction stage and vacuum distillation of water and fractions <250° C. is placed into the steam stripping apparatus. Contents of liquid products is 76.2% wt (152.3 gr) and solid residue 23.8% wt. (47.7 gr) respectively. The operation of said unit was described above. Checking of recovery range after steam stripping tests was made by sample washing in Soxhlet apparatus by tetrahydrofuran solvent (THF).

Results of oil separation by steam stripping tests are presented in Table 9.

TABLE 9

Tests of slurry product 2 deoiling by steam stripping (distillation).

| Test No | Temperature, ° C. steam | Temperature, ° C. oven | cool. water | Steam Consumption, l/min | Test duration, min | Condensate water, ml | Condensate oil, g | Oil recovery, % wt |
|---|---|---|---|---|---|---|---|---|
| 1 | 159 | 251 | 5 | 22.6 | 90 | 824 | 144.23 | 94.7 |
| 2 | 159 | 300 | 5 | 15.8 | 90 | 530 | 150.93 | 99.1 |
| 3 | 160 | 349 | 7 | 19.6 | 110 | 720 | 152.30 | 100 |
| 4 | 159 | 401 | 9 | 25.0 | 100 | 780 | 151.54 | 99.5 |
| 5* | 156/32 | 350 | 6 | 7.5/8.0 | 120 | 314 | 152.30 | 100 |

*mix of steam and nitrogen

As can be seen from data in Table 9 the offered invention of liquid/solid separation is effective enough in temperature range 250-400° C., while preferable is temperature 350° C. Not full recovery of oil at 400° C. (test number 4) can be explained by partially coking of heavy oil part.

The thermal extraction stage proceeded in optimal conditions determined during autoclave tests: 350° C., 10.0 atm., residence time 15 min. The stage at which the slurry product was vacuum-distilled took place in 10 mm Hg vacuum. The stage of the solid/liquid separation of the remaining slurry-product was performed by steam stripping apparatus at optimal temperature 350° C. The results of the combined process and the computed yield after each stage are summarized in Table 10.

TABLE 6

Elemental analysis of liquid and solid products (for TE autoclave tests).

| Test code | Liquid products, % wt | | | | | | | Solid products, % wt | | | | | | | |
|---|---|---|---|---|---|---|---|---|---|---|---|---|---|---|---|
| | C | H | N | S | $O_{diff.}$ | H/C | Q, Kcal/kg | O.M. | C | H | N | S | $O_{diff.}$ | H/C | Q, Kcal/kg |
| TE1 | 79.22 | 9.02 | 5.20 | 0.19 | 6.37 | 1.37 | 8,475.1 | 32.71 | 19.44 | 1.86 | 2.90 | 0.41 | 8.10 | 1.15 | 1,832.3 |
| TE2 | 76.40 | 9.16 | 5.58 | 0.20 | 8.66 | 1.44 | 8,221.8 | 33.45 | 20.02 | 2.02 | 3.10 | 0.37 | 7.94 | 1.21 | 1,921.7 |
| TE3 | 75.86 | 9.23 | 5.66 | 0.18 | 9.07 | 1.46 | 8,184.1 | 35.25 | 21.15 | 2.23 | 3.42 | 0.36 | 8.09 | 1.27 | 2,060.8 |
| TE6 | 76.55 | 9.52 | 5.41 | 0.17 | 8.35 | 1.49 | 8,329.8 | 36.65 | 22.84 | 2.48 | 3.66 | 0.43 | 7.24 | 1.30 | 2,283.1 |
| TE4 | 79.22 | 9.16 | 5.25 | 0.18 | 6.19 | 1.39 | 8,513.9 | 24.68 | 16.54 | 1.58 | 2.48 | 0.33 | 3.75 | 1.15 | 1,639.5 |
| TE5 | 80.52 | 9.30 | 5.15 | 0.14 | 4.89 | 1.39 | 8,686.4 | n.d. | 13.84 | 1.21 | 2.12 | n.d. | n.d. | 1.05 | n.d. |
| TE7 | 78.27 | 10.88 | 1.54 | 1.60 | 7.71 | 1.67 | 8,857.5 | 38.21 | 24.14 | 2.56 | 3.82 | 2.18 | 5.51 | 1.27 | 2,498.5 |
| TE8 | 79.20 | 10.62 | 1.67 | 1.61 | 6.90 | 1.61 | 8,890.2 | 31.72 | 21.46 | 2.12 | 3.28 | 1.96 | 2.90 | 1.19 | 2,235.3 |
| TE9 | 78.42 | 10.73 | 1.98 | 1.42 | 7.45 | 1.64 | 8,834.8 | 29.10 | 20.84 | 1.95 | 3.12 | 1.92 | 1.27 | 1.12 | 2,184.6 |
| TE10 | 80.24 | 10.28 | 2.03 | 2.53 | 4.92 | 1.54 | 8,966.2 | 28.79 | 20.43 | 1.91 | 3.03 | 1.87 | 1.55 | 1.12 | 2,133.0 |
| TE13 | 80.26 | 10.40 | 1.90 | 1.32 | 6.12 | 1.55 | 8,934.7 | 29.00 | 20.98 | 1.84 | 3.09 | 1.62 | 1.47 | 1.05 | 2,155.9 |
| TE11 | 81.76 | 10.52 | 1.29 | 0.35 | 6.08 | 1.54 | 9,061.5 | 37.68 | 26.74 | 2.52 | 4.20 | 0.57 | 3.65 | 1.13 | 2,705.8 |
| TE12 | 82.18 | 10.47 | 1.57 | 0.32 | 5.46 | 1.53 | 9,098.6 | 29.96 | 22.38 | 2.03 | 3.31 | 0.44 | 1.80 | 1.09 | 2,276.8 |
| TE14 | 83.10 | 10.48 | 1.78 | 0.27 | 4.37 | 1.51 | 9,202.6 | 29.46 | 22.24 | 1.93 | 3.30 | 0.33 | 1.66 | 1.04 | 2,241.6 |
| TE16 | 78.30 | 9.94 | 2.20 | 1.65 | 7.91 | 1.52 | 8,624.8 | 28.46 | 20.76 | 2.08 | 3.10 | 0.98 | 1.54 | 1.20 | 2,178.7 |
| TE15 | 79.10 | 10.26 | 2.28 | 1.58 | 6.78 | 1.56 | 8,795.9 | 25.47 | 17.80 | 1.76 | 2.73 | 0.84 | 2.34 | 1.19 | 1,835.8 |
| TE17 | 81.09 | 10.76 | 1.86 | 1.61 | 4.68 | 1.59 | 9,135.4 | 28.84 | 19.90 | 2.25 | 3.08 | 0.81 | 2.80 | 1.36 | 2,113.7 |
| TE19 | 75.83 | 10.26 | 5.48 | 0.12 | 8.31 | 1.62 | 8,453.3 | 20.54 | 15.29 | 1.60 | 2.30 | 0.24 | 1.11 | 1.26 | 1,609.5 |
| TE18 | 76.10 | 10.14 | 5.65 | 0.14 | 7.97 | 1.60 | 8,455.0 | 19.67 | 14.64 | 1.53 | 2.21 | 0.22 | 1.07 | 1.25 | 1,540.1 |
| TE20 | 79.14 | 10.32 | 5.18 | 0.09 | 5.27 | 1.56 | 8,814.4 | 18.78 | 14.32 | 1.47 | 2.18 | 0.21 | 0.60 | 1.23 | 1.511.4 |

TABLE 7

Data of gas chromatography analysis (autoclave tests).

| Test Code | Gas volume, L | $H_2$ | CO | $CO_2$ | $H_2S$ | $CH_4$ | $C_2H_4$ | $C_2H_6$ | $C_3H_6$ | $C_3H_8$ | $C_4H_8$ | $C_4H_{10}$ | $C_5$ | $C_6$ | Q, Kcal/kg |
|---|---|---|---|---|---|---|---|---|---|---|---|---|---|---|---|
| TE1 | 1.62 | 1.47 | 5.49 | 80.19 | 1.58 | 4.68 | 0.57 | 1.12 | 0.33 | 1.23 | 0.74 | 0.29 | 0.06 | 0.09 | 753.8 |
| TE2 | 1.98 | 0.68 | 4.18 | 88.58 | 1.65 | 1.69 | 0.46 | 0.27 | 0.17 | 0.33 | 0.45 | 0.09 | 0.03 | 0.00 | 313.1 |
| TE3 | 1.88 | 0.51 | 3.97 | 88.67 | 1.65 | 1.20 | 0.43 | 0.20 | 0.14 | 0.22 | 0.42 | 0.05 | 0.01 | 0.00 | 256.5 |
| TE6 | 1.47 | 0.50 | 3.31 | 92.14 | 0.11 | 0.59 | 0.32 | 0.10 | 0.11 | 0.11 | 0.16 | 0.03 | 0.01 | 0.00 | 159.4 |
| TE4 | 2.45 | 1.50 | 5.70 | 82.69 | 0.97 | 4.90 | 0.52 | 0.98 | 0.31 | 0.78 | 0.24 | 0.24 | 0.07 | 0.00 | 638.8 |
| TE5 | 3.21 | 4.01 | 6.24 | 73.60 | 1.27 | 7.51 | 0.55 | 2.51 | 0.49 | 2.08 | 0.40 | 0.45 | 0.08 | 0.01 | 1,183.7 |
| TE7 | 1.80 | 0.44 | 3.60 | 91.52 | 0.50 | 1.19 | 0.38 | 0.22 | 0.15 | 0.21 | 0.07 | 0.05 | 0.03 | 0.00 | 213.2 |
| TE8 | 2.37 | 0.51 | 3.81 | 90.23 | 1.27 | 1.78 | 0.40 | 0.36 | 0.21 | 0.38 | 0.12 | 0.08 | 0.03 | 0.00 | 286.5 |
| TE9 | 2.77 | 0.52 | 4.57 | 83.40 | 3.57 | 3.55 | 0.43 | 0.70 | 0.30 | 0.79 | 0.30 | 0.19 | 0.09 | 0.02 | 504.4 |
| TE10 | 2.75 | 0.80 | 5.35 | 79.14 | 4.38 | 5.59 | 0.42 | 1.26 | 0.42 | 1.30 | 0.33 | 0.25 | 0.10 | 0.03 | 748.6 |
| TE13 | 3.81 | 1.93 | 6.34 | 66.59 | 6.99 | 9.26 | 0.52 | 2.81 | 0.76 | 2.56 | 0.72 | 0.30 | 0.27 | 0.07 | 1,391.9 |
| TE11 | 2.49 | 0.41 | 3.42 | 91.66 | 0.39 | 1.17 | 0.35 | 0.19 | 0.18 | 0.25 | 0.12 | 0.08 | 0.04 | 0.00 | 218.4 |
| TE12 | 2.92 | 1.12 | 4.45 | 83.25 | 0.74 | 5.23 | 0.43 | 0.96 | 0.38 | 1.19 | 0.37 | 0.26 | 0.10 | 0.03 | 680.2 |
| TE14 | 3.35 | 2.19 | 4.83 | 76.34 | 1.65 | 7.38 | 0.49 | 2.16 | 0.59 | 2.24 | 0.54 | 0.46 | 0.26 | 0.05 | 1,121.6 |
| TE16 | 2.54 | 0.45 | 4.42 | 82.71 | 4.54 | 4.02 | 0.46 | 0.74 | 0.30 | 0.75 | 0.22 | 0.15 | 0.07 | 0.04 | 514.0 |
| TE15 | 3.02 | 0.82 | 5.58 | 72.59 | 7.41 | 7.23 | 0.55 | 1.72 | 0.56 | 1.71 | 0.46 | 0.34 | 0.16 | 0.06 | 987.5 |
| TE17 | 2.75 | 0.87 | 5.60 | 75.78 | 7.28 | 5.93 | 0.43 | 1.26 | 0.40 | 1.25 | 0.30 | 0.23 | 0.10 | 0.06 | 766.5 |
| TE19 | 2.95 | 0.57 | 4.64 | 87.93 | 1.19 | 1.82 | 0.48 | 0.39 | 0.27 | 0.47 | 0.14 | 0.12 | 0.06 | 0.02 | 353.7 |
| TE18 | 3.26 | 1.42 | 7.48 | 75.40 | 1.99 | 6.07 | 0.51 | 1.60 | 0.53 | 2.46 | 0.69 | 0.80 | 0.29 | 0.06 | 1,091.3 |
| TE20 | 3.57 | 1.54 | 5.68 | 75.18 | 1.88 | 8.44 | 0.53 | 1.94 | 0.78 | 2.31 | 0.76 | 0.48 | 0.23 | 0.06 | 1,179.7 |

TABLE 8

Elemental analysis of feed and solvents.

| Sample code | Sample origin | C | H | N | S | $O_{diff}$ | H/C | Q, Kcal/kg |
|---|---|---|---|---|---|---|---|---|
| M | mazut from crude oil | 87.87 | 10.70 | 0.40 | 0.36 | 0.67 | 1.46 | 9,741.6 |
| SO/1 | retort. shale oil, fr. 250-400° C. (old) | 82.75 | 10.56 | 0.58 | 5.00 | 1.11 | 1.53 | 9,401.7 |
| SO/2 | retort. shale oil, fr. 250-400° C. (fresh) | 80.64 | 10.70 | 0.63 | 6.58 | 1.45 | 1.59 | 9,297.4 |
| SSO | retorting oil from SS | 80.16 | 12.05 | 6.30 | 0.19 | 1.30 | 1.80 | 9,428.4 |
| SSO/5 | retort. oil from SS, fr. 300-350° C. | 76.94 | 10.34 | 6.99 | 0.18 | 5.55 | 1.61 | 8,636.2 |
| SSO/6 | retorting oil from SS, fr. >350° C. | 80.68 | 11.30 | 4.19 | 0.41 | 3.42 | 1.68 | 9,236.6 |
| SS | Sewage sludge (ash = 31.5%) | 37.97 | 5.80 | 5.49 | 0.30 | 18.94 | 1.83 | 4,017.7 |

TABLE 10

Combined Thermal Extraction-Steam Stripping Process
(Balance and Conversions)

| In | Out |
|---|---|
| Step of thermal extraction (350° C., 1:1, 15 min) | |
| Feed slurry, including: | 95.0 gr - gas |
| 1125.0 gr - solvent | Slurry-product 1 - 2155 gr |
| 1125.0 gr - SSdry including: | including: |
| 770.6 gr - O.M. | 1693.8 gr - oil |
| 354.4 gr - Ash. | 461.2 gr - solid residue |
|  | including: 106.8 gr - O.M. |
|  | 354.4 gr - Ash |
| Total: 2250.0 gr | Total: 2250 gr |
| Step of slurry-product 1 vacuum distillation | |
| Slurry-product 1 - 2155 gr, including: | Oil fraction <250° C. - 220.16 gr |
| 1693.8 gr - oil | Slurry-product 2 remainder - 1934.84 gr |
|  | including: oil fraction >250° C. - 1473.64 gr |
| 461.2 gr - solid residue | solid residue - 461.2 gr |
| Total: 2155.0 gr | Total: 2155.0 gr |
| Step of steam stripping | |
| Slurry-product 2 - 1934.84 gr, | Oil - 1473.64 gr |
| including: oil - 1473.64 gr Solid solid residue - 461.2 gr | residue - 461.2 gr |
| Total: 1934.84 gr | Total: 1934.84 gr |
| Conversions on dry basis, % wt: | |
| Total: | (1125.0-461.2): 1125.0 × 100 = 59.00 |
| Yield of liquids: | (1693.8-1125.0): 1125.0 × 100 = 50.56 |
| Yield of gas: | 95.0: 1125.0 × 100 = 8.44 |
| Yield of O.M. solid residue: | 461.2: 1125.0 × 100 = 41.00 |
| Conversions on dry ash free basis, % wt daf: | |
| Total: | (770.6-106.8): 770.6 × 100 = 86.14 |
| Yield of liquids: | (1693.8-1125.0): 770.6 × 100 = 73.81 |
| Yield of gas: | 95.0: 770.6 × 100 = 12.33 |
| Yield of O.M. solid residue: | 106.8: 770.6 × 100 = 13.86 |

It will be evident to those skilled in the art that the invention is not limited to the details of the foregoing illustrative embodiments and that the present invention may be embodied in other specific forms without departing form the spirit or essential attributes thereof. The present embodiments are therefore to be considered in all respects as illustrative and not restrictive, the scope of the invention being indicated by the appended claims rather then by foregoing description, and all changes which come within the meaning and range of equivalency of the claims are therefore intended to be embraced therein.

The invention claimed is:

1. A multi-stage process for the treatment of sewage sludge comprising the steps of:
   (a) drying sewage sludge waste to reduce a water content of the sewage sludge waste to below about 15% so as to result in dried sewage sludge;
   (b) mixing the dried sewage sludge with a first solvent medium so as to result in a slurry;
   (c) subjecting the slurry to a thermo-chemical liquefaction process in the presence of a second solvent medium at a temperature ranging from about 275° C. to about 375° C. and a pressure of up to about 10 atmospheres so as to result in a first slurry product comprising a gaseous product, a liquid product and a solid product;
   (d) separating the first slurry product into a second slurry product and a condensable gas, wherein the condensable gas comprises water and other liquid fractions boiling out at up to about 250° C.;
   (e) steam stripping the second slurry product at a temperature ranging from about 250° C. up to about 400° C., separating therefrom liquid products from solid residue so as to result in mix vapors and solid char;
   (f) cooling and separating the mix vapors so as to obtain two separate streams of an oil product and water; and
   (g) subjecting the oil product to vacuum distillation so as to recover oil fractions having a boiling temperature between about 250° C. to about 350° C. and oil fractions having a boiling temperature above about 350° C.

2. A multi-stage process according to claim 1 wherein the second solvent medium used in the thermo-chemical liquefaction process of step (c) is a liquid product with a boiling point above about 350° C.

3. A multi-stage process according to claim 1 wherein the first solvent medium and the second solvent medium are the same.

4. A multi-stage process according to claim 1 further comprising the step of:
   (h) recirculating the oil fractions having a boiling temperature above about 350° C. to the thermo-chemical liquefaction process of step (c) for use as the second solvent medium.

5. A multi-stage process according to claim 4 wherein the recirculated solvent medium serves as a hydrogen donor in step (c).

6. A multi-stage process according to claim 1 wherein step (e) is carried out at a temperature ranging from about 300° C. up to about 350° C.

7. A multi-stage process according to claim 1 wherein in step (a) the sewage sludge waste is dried to reduce the water content of the sewage sludge waste to below about 12%.

8. A multi-stage process according to claim 1 wherein in step (b) a ratio of solvent medium to dried sewage sludge is between about 0.75:1 and about 1.5:1.

9. A multi-stage process according to claim 1 wherein in step (b) a ratio of solvent medium to dried sewage sludge is about 1:1.

10. A multi-stage process according to claim 1 wherein step (e) is carried out at a temperature of about 350° C.

11. A multi-stage process according to claim 1 wherein step (e) is carried out by mix of water steam and inert gas.

12. A multi-stage process according to claim 1 wherein the condensable gas from step (d), the solid char from step (e) and the oil fractions having a boiling temperature above about 350° C. from step (g) are combined and employed as a combustion source in heat energy generation, wherein the energy is utilized in the multi-stage process.

13. A multi-stage process according to claim 1 wherein the oil product obtained in step (g) is a fuel product comprising oil distillates having a boiling temperature up to about 250° C. (Light Oil) and oil distillates having a boiling temperature between about 250° C. to about 350° C. (Middle Distillate).

14. A multi-stage process according to claim 1 wherein the sewage sludge waste is composed of organic materials.

* * * * *